US006996369B2

(12) United States Patent
Jimenez et al.

(10) Patent No.: US 6,996,369 B2
(45) Date of Patent: Feb. 7, 2006

(54) REPEATER FOR A SATELLITE PHONE

(75) Inventors: Jesus Hector Jimenez, Houston, TX (US); Yves Hendrickx, Lasne (BE)

(73) Assignee: Eagle Broadband, Inc., Houston, TX (US)

( * ) Notice: Subject to any disclaimer, the term of this patent is extended or adjusted under 35 U.S.C. 154(b) by 389 days.

(21) Appl. No.: 10/225,752

(22) Filed: Aug. 22, 2002

(65) Prior Publication Data

US 2004/0038644 A1 Feb. 26, 2004

(51) Int. Cl.
*H04B 7/185* (2006.01)

(52) U.S. Cl. .................... 455/13.3; 455/11.1; 455/13.1; 455/428; 455/16

(58) Field of Classification Search ................... 455/16, 455/13.1, 11.1, 15, 7, 12.1, 276.1, 562.1, 455/427, 13.3, 428, 18; 370/338
See application file for complete search history.

(56) References Cited

U.S. PATENT DOCUMENTS 2,257,094 A 9/1941 Goldstine
2,790,899 A 4/1957 Townsend
3,323,063 A 5/1967 Walker et al.
4,220,955 A 9/1980 Frye
4,850,006 A 7/1989 Sasaki et al.
4,903,326 A 2/1990 Zakman et al.
5,040,237 A 8/1991 Barnes et al.
5,048,117 A 9/1991 Aisaka et al.
5,084,864 A 1/1992 Turnbull et al.
5,233,626 A 8/1993 Ames
5,357,262 A 10/1994 Blaese
5,367,556 A 11/1994 Marui et al.
5,422,647 A 6/1995 Hirshfield et al.
5,438,610 A 8/1995 Bhagat et al.
5,440,315 A 8/1995 Wright et al.
5,448,623 A 9/1995 Wiedeman et al.
5,493,702 A 2/1996 Crowley et al.
5,504,493 A 4/1996 Hirshfield
5,519,761 A 5/1996 Gilhousen
5,526,404 A 6/1996 Wiedeman et al.
5,532,703 A 7/1996 Stephens et al.
5,552,798 A * 9/1996 Dietrich et al. ............. 343/893
5,668,561 A 9/1997 Perrotta et al.
5,711,014 A 1/1998 Crowley et al.
5,774,789 A 6/1998 van der Kaay et al.
5,822,705 A 10/1998 Lehtola
5,890,055 A 3/1999 Chu et al.
5,898,408 A 4/1999 Du
5,912,641 A 6/1999 Dietrich
5,940,038 A 8/1999 Brown
5,995,050 A 11/1999 Moller et al.
6,014,546 A 1/2000 Georges et al.
6,064,343 A 5/2000 Crowley et al.
6,069,592 A 5/2000 Wass
6,112,106 A 8/2000 Crowley et al.
6,134,437 A * 10/2000 Karabinis et al. ........... 455/427
6,594,471 B1 7/2003 Crowley et al.
6,885,845 B1 4/2005 Crowley et al.
2002/0028655 A1 * 3/2002 Rosener et al. ............... 455/16
2003/0161288 A1 * 8/2003 Unruh ........................ 370/338
2004/0110469 A1 * 6/2004 Judd et al. .................... 455/15

* cited by examiner

*Primary Examiner*—Nick Corsaro
*Assistant Examiner*—Tan Trinh
(74) *Attorney, Agent, or Firm*—Conley Rose, P.C.

(57) ABSTRACT

A repeater is disclosed which is usable to permit a satellite phone, normally requiring a direct line of sight link to an orbiting satellite, to communicate with the satellite when the satellite phone is otherwise obstructed from communicating with the satellite. The repeater is usable in any situation in which the satellite phone is blocked from a direct line of site to the satellite, such as inside a building, aircraft, or natural formation (e.g., cave).

13 Claims, 3 Drawing Sheets

50
80
60
82
64
52
84 POWER AMP
86 PRE AMP
88 PRE AMP

REPEATER FOR A SATELLITE PHONE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to a repeater for a satellite communication device that permits communications between the communication device and the satellite without having a direct line of sight to the orbiting satellite.

2. Background of the Invention

Relatively recently, satellite phones have been introduced into the market. A satellite phone communicates directly with an orbiting satellite thereby permitting the user of the phone to make or receive a phone call from virtually anywhere on earth. A significant limitation is that there must be an unobstructed, direct line-of-sight between the satellite and the satellite phone. Thus, such phones are generally unusable inside buildings, houses, caves, airplanes or, in general, anywhere that the phone does not have direct line-of-sight to the satellite. A solution this problem would be highly desirable and would make satellite phone technology much more usable.

BRIEF SUMMARY OF THE INVENTION

The problems noted above are solved in large part by a repeater usable to permit a satellite phone, normally requiring a direct line-of-sight link to an orbiting satellite, to communicate with the satellite when the satellite phone is otherwise obstructed from communicating with the satellite. The repeater disclosed herein is usable in any situation in which the satellite phone is blocked from a direct line-of-site to the satellite, such as inside a building, aircraft, or natural formation (e.g., cave).

In accordance with one preferred embodiment, the satellite phone repeater comprises a first antenna (exterior) receptive to downlink signals transmitted by a satellite, a downlink low-noise amplifier that receives and amplifies signals from the first antenna to a second antenna (interior) that receives the amplified signals from the downlink amplifier and broadcasts the amplified signals to the satellite phone. The repeater also includes a third antenna (interior) receptive to signals transmitted by satellite phone, an uplink power amplifier that receives and amplifies signals from the third antenna, and a fourth antenna (exterior) that receives the amplified signals from the uplink power amplifier and broadcasts the amplified signals to be received by the satellite.

In accordance with another embodiment, the satellite phone repeater comprises a first antenna (exterior) receptive to downlink signals transmitted by a satellite and adapted to transmit uplink signals to the satellite. A second antenna (interior) is adapted to transmit signals to and receive signals from the satellite phone. This is accomplished by employing a diplexer that is positioned between the antenna and amplifiers. This embodiment also includes a downlink amplifier coupled between the first and second amplifiers. The downlink amplifier is adapted to amplify signals received from the satellite via the first antenna. Also included are an uplink amplifier coupled between the first and second amplifiers, a first diplexer disposed between the amplifiers and the first antenna, a second diplexer disposed between the amplifiers and the second antenna, and a control unit coupled to the first and second diplexers. The uplink amplifier is adapted to amplify signals received from the satellite phone via the second antenna. The control unit operates the first and second diplexers to permit two-way communications to occur between the satellite and the satellite phone via the first and second antennas.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
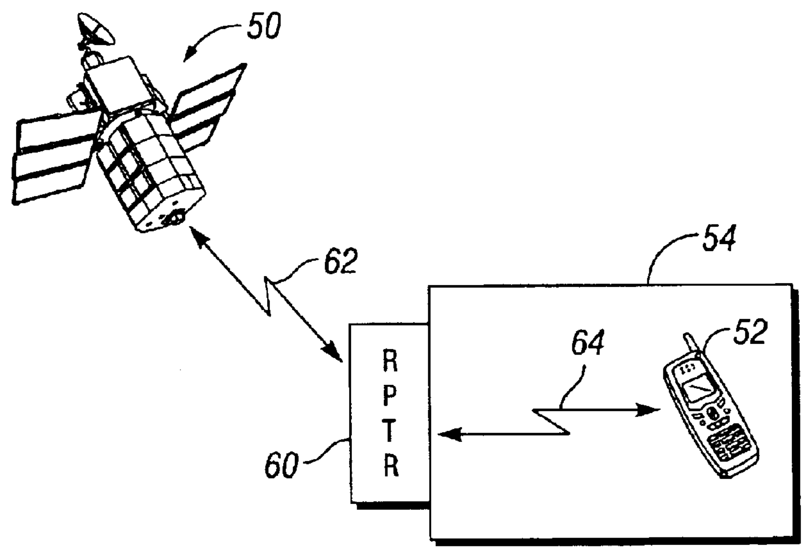
FIG. 1 shows a system level diagram of a repeater providing a wireless interface between a satellite phone and an orbiting satellite especially when the phone does not have a direct line-of-sight to the satellite.

Referring now to FIG. 1, in accordance with a preferred embodiment of the invention, a satellite 50 communicates with a satellite phone 52 located within a structure 54 that prevents effective communications between the phone 52 and the satellite 50. The phone may be, for example, a 9520 Mobile Phone provided by Motorola. The structure 54 may be a building, a natural formation such as a cave, the exterior surface of an airplane, or in general any material or object that precludes an effective line-of-sight communication link between satellite 50 and phone 52. In accordance with the preferred embodiment, a repeater 60 is provided which permits the satellite phone and satellite to communicate indirectly with each other.

The repeater 60 preferably enables two, two-way communication links—one link 62 to the satellite 50 and another link 64 to the satellite phone 52. The repeater 60 functions to pass incoming transmissions from the satellite 50 to the phone 52, as well as pass transmission from the phone to the satellite. As such, the repeater 60 provides a communication pipeline between the satellite and phone. The repeater preferably is located inside the structure 54, but an antenna (not specifically shown in FIG. 1) included as part of the repeater is positioned outside the structure 54 so that a direct line-of-sight to the satellite 50 can effectively be obtained with respect to the repeater.

Figure 2:
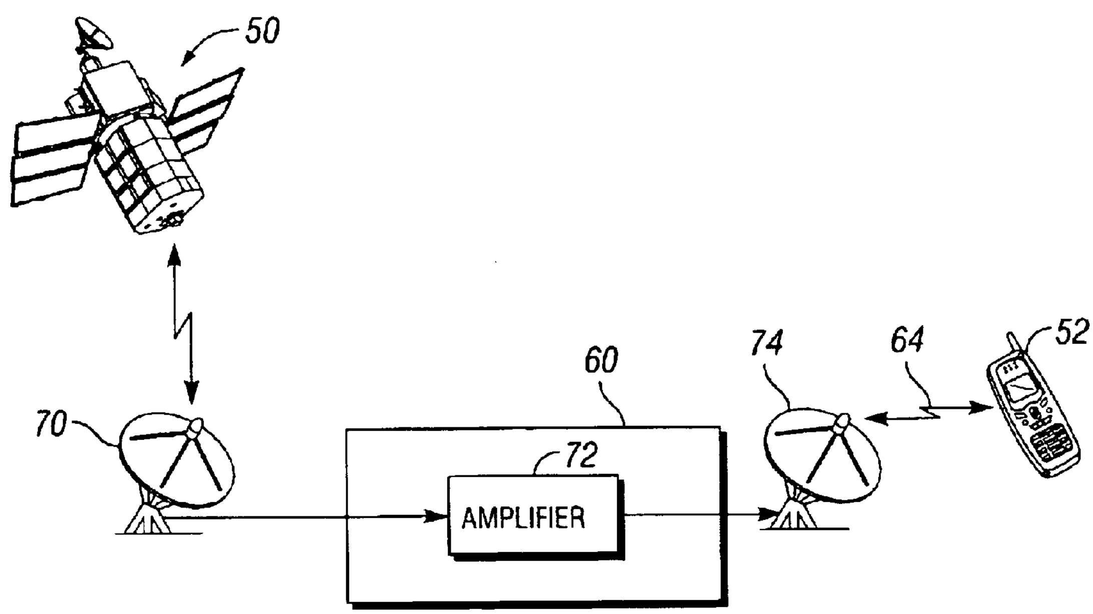
FIG. 2 shows a preferred embodiment of the downlink capability of the repeater.
Figure 3:
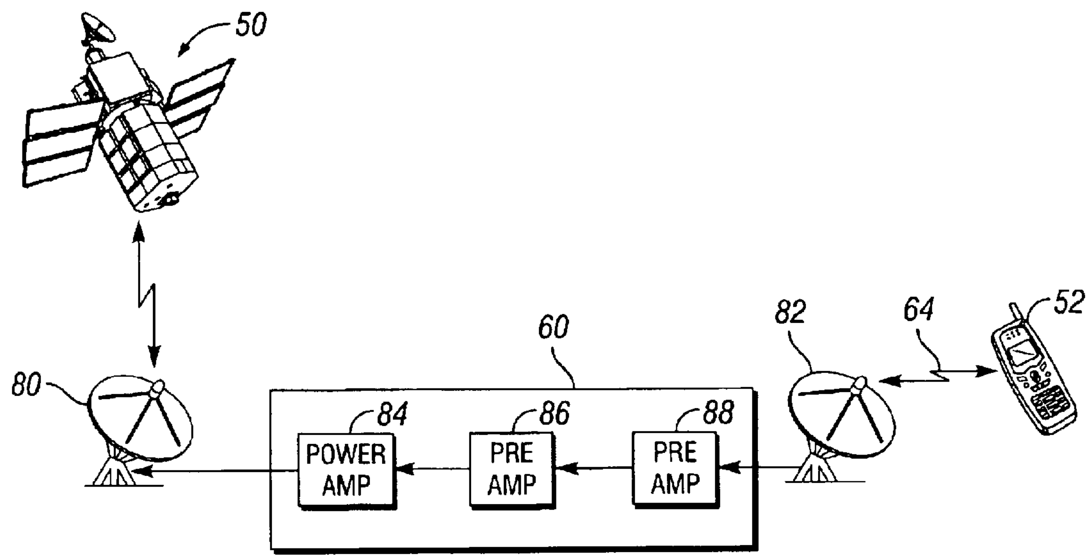
FIG. 3 shows a preferred embodiment of the uplink capability of the repeater.

FIGS. 2 and 3 show a preferred embodiment of the repeater 60. FIG. 2 shows an exemplary embodiment of the repeater usable to receive downlink (i.e., earth-bound) transmissions from the satellite and forward such transmissions on to the satellite phone 52. FIG. 3 shows an exemplary embodiment of the repeater 60 usable to receive satellite-bound (uplink) transmissions from the phone 52 and forward such transmissions on to the satellite 50.

Referring now to FIG. 2, the repeater 60 includes an amplifier 72 and antennas 70 and 74. The antenna 70 receives earth-bound (downlink) signals from satellite 50 and provides those signals to amplifier 72. Antenna 70 is located near the downlink receiver 60 in a configuration which gives the antenna a direct line-of-sight to the satellite. For example, the downlink receiver 60 will be housed in an enclosure. The antenna 70 will be mounted on an outer surface of the enclosure. Alternatively, the antenna 70 may be mounted apart from the receiver and connected to the receiver's electronics via a suitable low-loss RF coaxial cable in accordance with known techniques. The antenna 70 may be any suitable antenna such as the S67-1575-109 exterior aircraft antenna manufactured by Sensor Systems. This particular antenna has a frequency response of 1616–1626.5 MHz and a return loss of −9.5 dB.

The downlink transmissions received by antenna 70 are provided to amplifier 72 which filters and amplifies the downlink signal. The amplifier 72 is any suitable low-noise amplifier usable as described herein. One suitable embodiment of amplifier 72 is the Iridium low noise amplifier (LNA) which has a frequency response of 1600–1650 MHz, a gain of +76 dB, a P1dB of +10 dBm, an input voltage of +15.0 VDC and a maximum current rating of 190 mA.

From the amplifier 72, the filtered and amplified signals are provided to the satellite phone 52 via antenna 74. Antenna 74 need not have a direct line-of-sight to the satellite 50. Rather, antenna 74 need only be able to transmit signals to the satellite phone 52 which generally is in relatively close proximity to the downlink receiver 60. The antenna 74 may be any suitable antenna and, in fact, may the same type of antenna as antenna 70. As such, antenna 74 may also be the S67-1575-109 exterior aircraft antenna manufactured by Sensor Systems having a frequency response of 1616–1626.5 MHz and a return loss of −9.5 dB.

Referring now to FIG. 3, an embodiment of the repeater 60 is shown permitting uplink transmissions to occur from satellite phone 52 to satellite 50 without the phone having a direct line-of-sight to the satellite. In this embodiment, the uplink transmitter 60 has an antenna 80 which is coupled to the repeater similar to how antenna 70 coupled to the downlink receiver in FIG. 2. Antenna 80 is used to transmit signals received from the phone through the uplink transmitter to the satellite 50. The uplink transmitter 60 also couples to an antenna 82 which receives signals from phone 52 and provides those signals to the uplink transmitter's electronics comprising, in accordance with the preferred embodiment, two preamp stages 86 and 88 and an power amplifier 84. Antennas 80 and 82 may the same types of antennas as are used to implement antennas 70 and 74 in FIG. 2. The two preamp stages 86 and 88 may the same, or different. In one embodiment, the preamp stages comprise Iridium XMIT Preamps which have a frequency response of 1600–1650 MHz, a return loss of 2.0:1, a gain of +56 dB, a P1dB of +10 dBm, an input voltage of +15 VDC, and a maximum current of 150 mA. The power amplifier 84 preferably comprises an Iridium XMIT Power Amplifier which has a frequency response of 1600–1650 MHz, a return loss of 2.0:1, a gain of +36 dB, a P1 dB of +38 dBm, an input voltage of +15 VDC, and a maximum current of 3500 mA. Although the embodiment shown in FIG. 3 includes three amplifier/preamp stages, in other embodiments, the preamp stages could be combined together into a single preamp stage. Further, all three stages could be combined together into a single stage.

Figure 4:
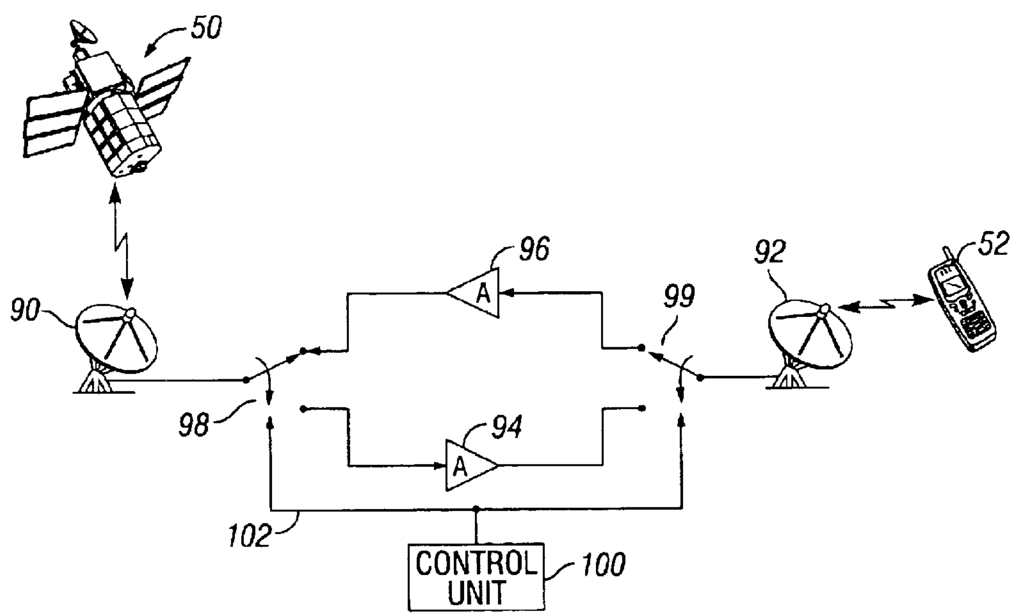
FIG. 4 shows an alternative embodiment of the repeater.

An alternative embodiment of repeater 60 is shown in FIG. 4. In this embodiment, only one pair of antennas 90 and 92 is used for both downlink and uplink transmissions between satellite and satellite phone. As shown, antenna 90 is used for the communication link to the satellite and antenna 92 is used for the communication link to the phone. Both antennas may be implemented using the same type of antennas described previously.

In the embodiment of FIG. 4, receiver 60 preferably includes a pair of electronically controlled diplexers 98 and 99, a control unit 100 and a pair of amplifiers 94 and 96. Other components may be included as desired. Amplifier 94 is used to amplify downlink signals from the satellite before transmitting such signals to the satellite phone. Amplifier 96 amplifies the uplink signals from the satellite phone before transmitting the signals to the satellite.

Under control of control unit 100, diplexers 98 and 99 selectively couple the RF energy from either the uplink amplifier 96 or the downlink amplifier 94 between antennas 90 and 92. The diplexers work in concert based on the control signal 102 from the control unit 100 either to switch uplink amplifier 96 into the closed transmission path between antennas 90 and 92 (as shown in FIG. 4) or to switch downlink amplifier 94 into the closed transmission path. The control unit 100 thus causes RF energy to be transmitted from antenna 90 to antenna 92 for a brief period of time followed by transmitting the RF energy from antenna 92 to antenna 90 for a brief period of time. This process is repeated numerous times per second in a way that is generally unnoticeable to a user of the satellite phone. In accordance with known diplexing techniques, the control unit 100 extracts control pulses from the satellite signal to determine when to switch between amplifiers 94 and 96.

The embodiment shown in FIG. 4 advantageously requires only two antennas, instead of four antennas as shown in FIGS. 2 and 3. The use of a control unit 100 and diplexers 98 and 99 enable the receiver 60 of FIG. 4 to have a reduced the number of antennas.

As one of ordinary skill in the art would know, the various antennas used in the embodiments described above may need to be positioned in a way that reduces the potential for one antenna to pick up the transmission from another antenna. In FIG. 4, for example, it is possible for transmissions from antenna 92 to the satellite phone to also be received by antenna 90 and reamplified and provided again to antenna 92. Thus, the antennas 90, 92 preferably are separated so as to increase RF isolation between the antennas 90 and 92. This practice reduces the potential for such "cross talk." This can be accomplished in accordance with known techniques and principles by positioning the antennas sufficiently far apart which, of course, will depend on the specific parameters of each application, as would be well known. In addition, two types of isolation may be employed when possible. The first, horizontal isolation, is a practice in which the antennas are horizontally separated or distanced as far apart as possible. For example, in an aircraft scenario, antenna 90 may be positioned on the front end of the aircraft and antenna 92 may be positioned at the rear end of the aircraft. The distance between the antennas 90 and 92 is the horizontal isolation. The second, vertical isolation, is another practice in which the antennas are vertically separated or distanced as far apart as possible. For example, in a fixed or stationary environment, the uplink antenna 90 may be positioned on a communications tower several feet above the downlink antenna 92. The uplink antenna 90 must be placed above the downlink antenna 92 because the uplink antenna 90 may be radiating, for example, 5 watts to the satellite. This energy must refrain from entering the downlink antenna 92 and subsequent amplification path.

It should be understood that isolation is not limited to any one method. A combination of horizontal and vertical isolation will be employed when possible. Isolation maximization will reduce or eliminate the uplink signal from interfering with the downlink signal, and vice versa. Poor isolation will result in locking up or confusing the satellite phone, as would be understood by those of ordinary skill in the art. Consequently, without proper isolation, communication between the phone and satellite will be inconsistent or impossible.

The embodiments described above advantageously permits a user of a satellite phone to use the phone even though the orbiting satellite is obstructed thereby precluding direct communications between phone and satellite. A repeater has been shown and described which functions as a communication link between the satellite and the phone, thereby freeing the phone to be used in a location otherwise obstructed from the satellite.

Figure 5:
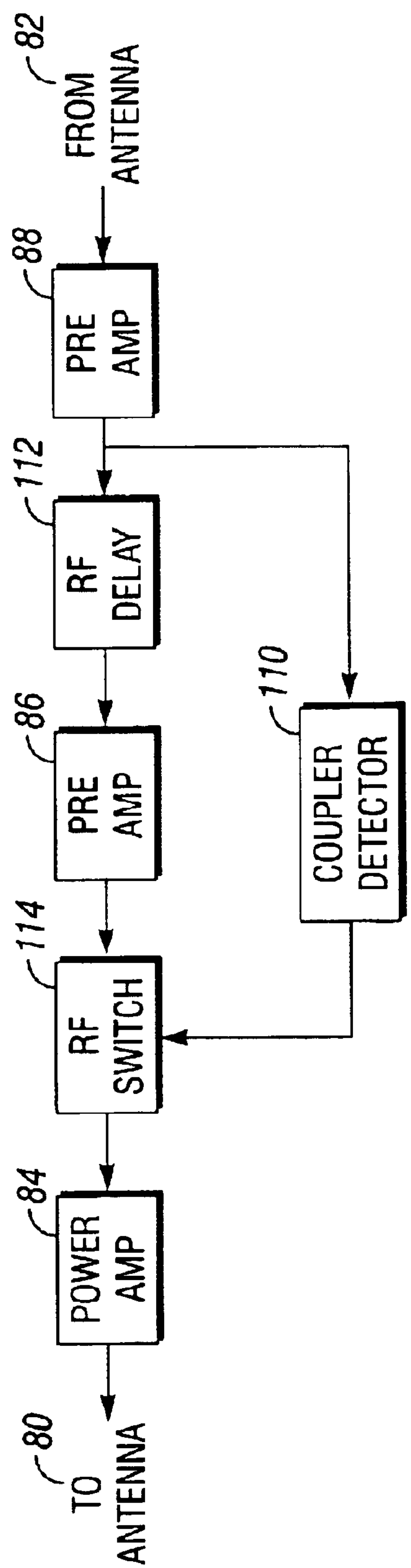
FIG. 5 shows an alternative embodiment to that of FIG. 3 which precludes the power amplifier from receiving any signals to amplify when no valid signal is present thereby minimizing crosstalk and interference.

In accordance with a further effort to improve isolation and help minimize crosstalk/interference, the input signal to the power amplifier 84 in FIG. 3 preferably is only provided to the power amplifier when a valid uplink signal is present. FIG. 5 shows the architecture of FIG. 3 to which this feature has been added. As shown in FIG. 5, a coupler/detector 110, RF delay 112 and RF switch 114 have been added. The coupler/detector 110 couples between the output of the preamp 88 and the RF switch 114. The RF switch is disposed between the preamp 86 and the power amp 84. The RF delay preferably is included between preamp stages 86 and 88.

The coupler/detector 110 preferably samples the RF signal from the preamp stage 88 and compares the sampled signal to a predetermined threshold to determine if a valid signal (e.g., voice conversation) is present. With no valid signal being present, the RF switch 114 normally is in an open state preventing a signal from being provided to the power amp 84, thereby preventing the power amp 84 from amplifying interference or crosstalk signals. If the coupler/detector 110 determines that a valid signal is present, the coupler/detector asserts its output signal which comprises a control signal to the RF switch 114 and which causes the RF switch to close. The closing of the RF switch permits the valid RF signal to be provided to the power amp 84 for further amplification and transmission to the antenna 80. Then, when a valid signal ceases (e.g., the user of the satellite phone ceases talking), the coupler/detector 110 causes the RF switch 114 to open thereby preventing the power amp from amplifying any signals.

As one of ordinary skill in the art will appreciate, there is time delay for the coupler/detector 110 to detect the presence of a valid signal, assert the output control signal, and the RF switch 114 to close. To prevent the valid signal from arriving at the RF switch 114 before the RF switch has a chance to close, a time delay element (i.e., RF delay 112) is included in the signal path. Thus, RF delay 112 accounts for the delay in the signal path that is introduced by the action of the controller/detector 110 and RF switch 114. The RF delay 112 can be any suitable time delay and of course correlates to the time delay created by the action of the coupler/detector 110 and RF switch 114. A suitable value for the RF delay 112 is a delay which results in the RF switch 114 closing approximately 2 nanoseconds before the arrival of the RF signal from preamp 86. Further, the coupler/detector 110 preferably causes the RF switch 114 to open approximately 2 nanoseconds after the valid RF signal ceases. Thus, the RF switch preferably is closed fast enough for the RF signal to pass through and be amplified in its entirety via power amp 84.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A satellite phone repeater providing a communication link between a satellite and a satellite phone, comprising:

- a first antenna receptive to signals transmitted by a satellite;
- a downlink amplifier that receives and amplifies signals from the first antenna;
- a second antenna that receives said amplified signals from said downlink amplifier and transmits said amplified signals for reception by the satellite phone;
- a third antenna receptive to signals transmitted by the satellite phone;
- an uplink amplifier that receives and amplifies signals from the third antenna;
- a fourth antenna that receives the amplified signals from said uplink power amplifier and transmits said amplified signals for reception by the satellite;
- a first uplink preamplifier coupled between said third antenna and said uplink amplifier; and
- an RF switch disposed between said first uplink preamplifier and said uplink amplifier, said RF switch being in an open state when no valid signal is present.

2. The satellite phone receiver of claim 1 further wherein said downlink amplifier has a frequency response of approximately 1600–1650 MHz and a gain of approximately 76 dB.

3. The satellite phone receiver of claim 1 further including a second uplink preamplifiers coupled between said third antenna and said first uplink preamplifier.

4. The satellite phone receiver of claim 3 further including an RF delay coupled between the uplink preamplifiers.

5. The satellite phone receiver of claim 3 wherein each of said pair of uplink preamplifiers have a frequency response of approximately 1600–1650 MHz and a gain of approximately 50 dB.

6. The satellite phone receiver of claim 1 further including a coupler/detector coupled to said first uplink amplifiers and providing a control signal to said RF switch to cause said RF switch to be either in an open state if no valid signal is detected or in an closed state if a valid signals is detected.

7. The satellite phone receiver of claim 6 further including an RF delay coupled between the uplink preamplifiers.

8. The satellite phone receiver of claim 1 further wherein said uplink amplifier has a frequency response of approximately 1600–1650 MHz and a gain of approximately 36 dB.

9. A satellite phone repeater providing a two-way communication link between a satellite and a satellite phone that can communicate with said satellite via a direct line of sight link to said satellite, but obstructed from having a direct line of sight link to said satellite, comprising:

at least one antenna communicating via a line of sight link to said satellite;

at least one antenna communicating with said obstructed satellite phone;

at least one downlink amplifier coupled between said antennas that amplifies signals received from said satellite;

at least two uplink amplifiers also coupled between said antennas that amplifies signals from said satellite phone;

an RF switch coupled between said at least two uplink amplifiers; and a coupler/detector coupled to said RF switch and at least one of said two uplink amplifiers wherein said coupler/detector causes said RF switch to close only if a valid signal is detected.

10. The satellite phone repeater of claim 9 wherein said coupler/detector causes said RF switch to be open and not pass RF signals therethrough if a valid signal is not detected.

11. The satellite phone repeater of claim 9 further including an RF delay coupled between the at least two uplink preamplifiers.

12. The satellite phone repeater of claim 9, further comprising:

a first diplexer disposed between said amplifiers and said at least one antenna communicating via a line of sight link to said satellite;

a second diplexer disposed between said amplifiers and said at least one antenna communicating with said obstructed satellite phone; and a control unit coupled to said first and second diplexers, said control unit operating said first and second diplexers so as to permit two-way communications to occur between said satellite and said satellite phone via said first and second antennas.

13. The satellite phone repeater of claim 12 wherein said control unit activates said first and second diplexers in accordance with information encoded in signals transmitted by said satellite.

* * * * *